June 9, 1959   E. H. WILLETTS ET AL   2,889,993
MOBILE IRRIGATOR OR SPRINKLER
Filed Nov. 2, 1954   2 Sheets-Sheet 1
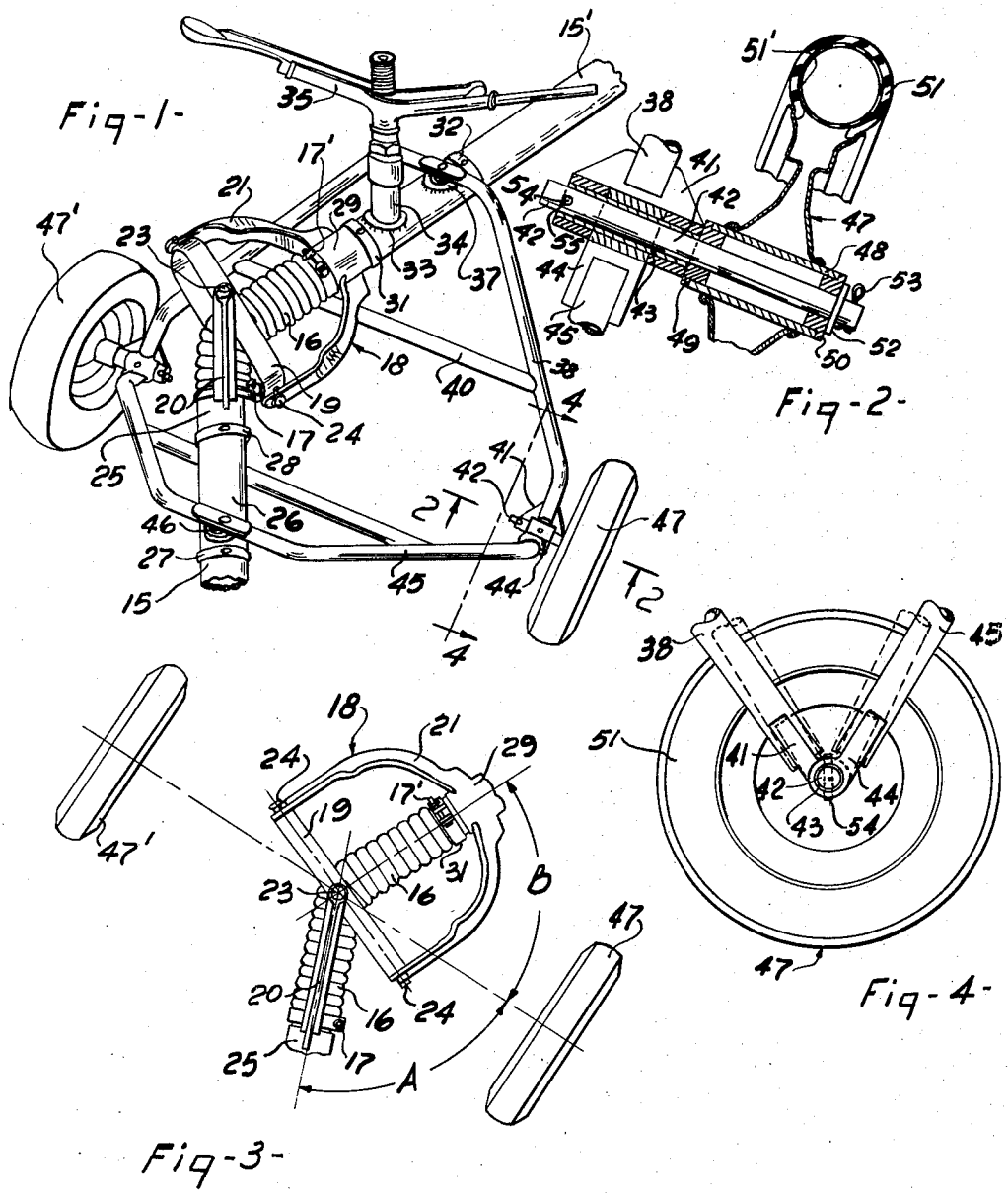
INVENTORS
ELWOOD H. WILLETTS,
CARL B. INGRAM &
BY LOUIS E. WATSON
ATTORNEY

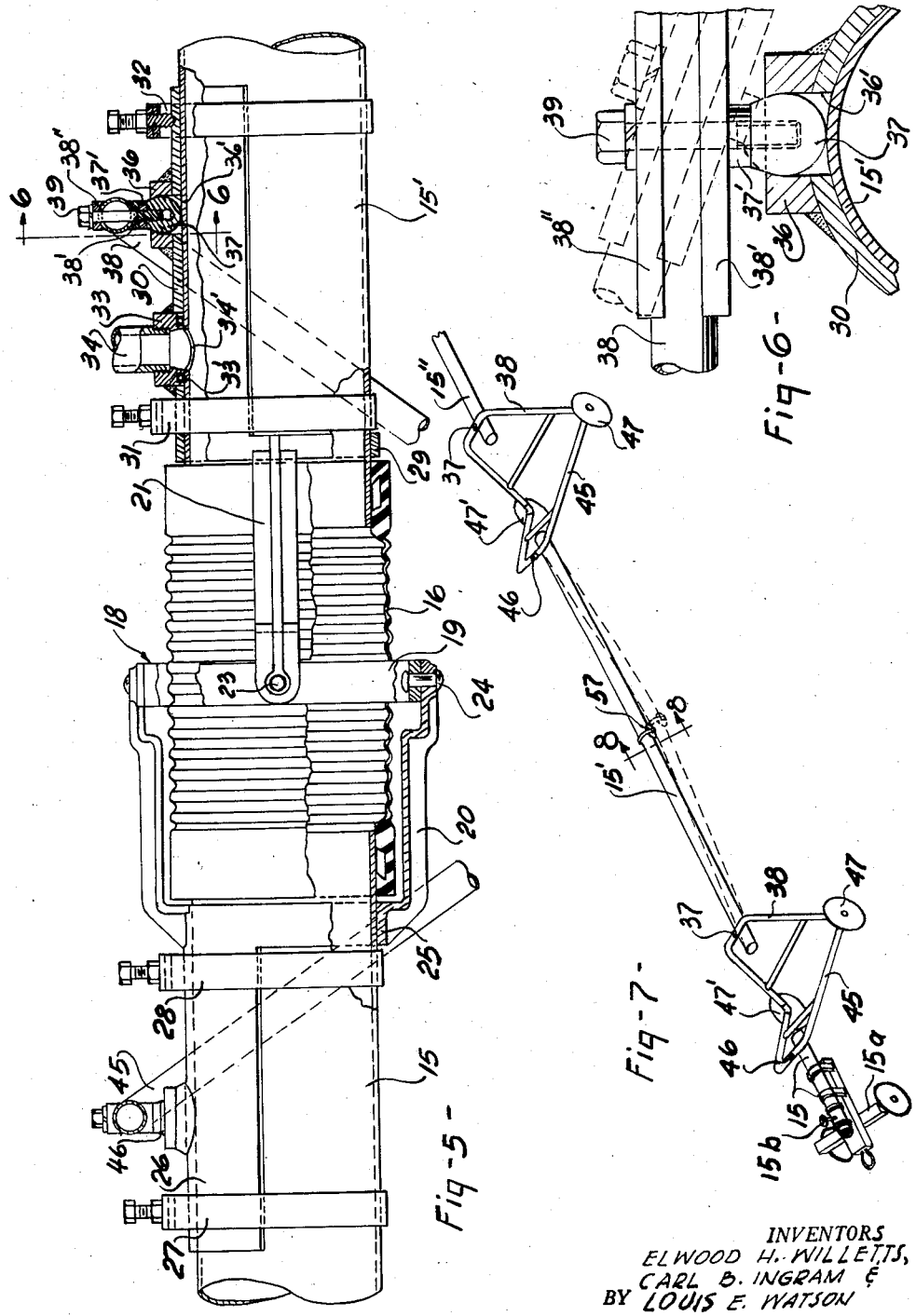

United States Patent Office 2,889,993
Patented June 9, 1959

2,889,993

MOBILE IRRIGATOR OR SPRINKLER

Elwood H. Willetts, Douglaston, Carl B. Ingram, El Monte, and Louis E. Watson, San Gabriel, Calif.; said Ingram and said Watson assignors to said Willetts Application November 2, 1954, Serial No. 466,412

4 Claims. (Cl. 239—111)

This invention relates to mobile irrigators or sprinklers for large area use and of a type that is transported by a tractor when moved from one area to another.

It is among the principal objects of the present invention to provide a mobile irrigator or sprinkler which is lighter in weight, more mobile and more economical to manufacture than irrigators of this type made heretofore.

It is another object of the present invention to provide in a mobile irrigator or sprinkler a flexible hydraulic pipe line coupling with an automatic mechanically-steered carriage which permits a maximum angle turn of the carriage and pipe and has freedom to negotiate uneven terrain without torsional strain being placed upon the hydraulic coupling when the sprinkler is being towed by the tractor over the field and upon making the turns.

It is still another object of the invention to provide a wheeled carriage for supporting the sprinkler pipe and the hydraulic coupling therebetween wherein the pulling strain will be taken between the pipe ends by a universal coupling or gimbal device centered about the coupling wherein the carriage wheel axis remains aligned with the center of the gimbal device so that the position of the carriage is controlled by the pipes.

It is still another and more specific object of the invention to provide a steerable pipe irrigator that comprises a flexible hydraulic coupling permitting angular movement of the end of one pipe relative to the end of the other pipe, a universal coupling or gimbal ring device connected between the ends of the pipe and surrounding the hydraulic coupling, a wheeled carriage having two supporting frames hingedly connected together at their lower ends with wheels journalled at the hinge points and ball and socket pivot connection means between the supporting frames and the respective pipes, whereby a positive relationship exists between all angular movements of adjacent pipes and the supporting frames.

It is a still further object of the invention to provide a mobile irrigator or sprinkler that has an automatic drain valve located intermediate the length of the pipe and midway of the carriages and removed from the pipe couplings that is normally open but automatically closes upon renewal of water pressure wherein the pipe is bowed under water load and sand or dirt sediment collects so that each time the pipes are drained, the sand and dirt sediment will be eliminated.

Still further objects of the invention are to provide a mobile irrigator with a positive automatic steering control which is simple in construction, has a minimum number of parts, inexpensive to manufacture, easy to initially assemble, light in weight yet durable, will have long life, compact, free of leakage, has a high clearance carriage, effective and efficient in use.

For other objects and a better understanding of the invention, reference may be had to the following detailed description taken in connection with the accompanying drawing, in which:

Figure 1 is a fragmentary top perspective view of the present mobile irrigator taken of the pipe connection and carriage for supporting the same, the pipes and carriage being angled as when a turn is being made during transport;

Fig. 2 is an enlarged fragmentary and sectional view taken generally on line 2—2 of Fig. 1, and of one hinge connection between the wheel supporting frames and with a wheel thereon;

Fig. 3 is a diagrammatic view illustrating the angular relationship of the intersection of the axes of the pipes relative to the wheel axis when pipe ends have been angled to each other;

Fig. 4 is a vertical sectional view taken on line 4—4 of Fig. 1 and looking upon the inner end of one hinge connection of the frames;

Fig. 5 is an enlarged detail fragmentary view of the pipe connection with portions thereof broken away to show the internal construction thereof;

Fig. 6 is a fragmentary sectional view looking upon the ball and socket connection on one of the supporting frames, the view being taken generally upon line 6—6 of Fig. 5;

Fig. 7 is a diagrammatic perspective view of two carriages with a pipe span therebetween, the pipes being deflected downwardly midway its length as if under a water load and showing the drain valve located thereat.

Referring now particularly to Figs. 1 to 7 and 15, 15' and 15" represent pipe sections forming a part of the mobile pipe line and which are joined together at their ends by a flexible hydraulic coupling 16. This coupling is secured to the respective pipe ends by band clamp devices 17 and 17'. Surrounding the coupling 16 and centered equidistant from pipe ends is a universal mechanical coupling or gimbal device 18. This gimbal device includes a gimbal ring 19 to which two yokes 20 and 21, that are disposed at right angles to each other are pivotally attached thereto by respective pivot pins 23 and 24. The yoke 20 has an annular portion 25 that surrounds the pipe 15 and from which extends a semi-cylindrical sleeve portion 26 that runs longitudinally along the top of the pipe 15 and is secured to the pipe 15 by longitudinally-spaced band clamps 27 and 28. The yoke 21 similarly has an annular portion 29 that surrounds the pipe 15' and a partial or longitudinally-extending semi-cylindrical sleeve portion 30 that overlies an opening 34' in the top of pipe 15' and is secured to the pipe 15' by longitudinally-spaced band clamps 31 and 32. The overlying sleeve portion 30 has an internally-threaded sleeve or boss 33 welded thereto to which a pipe 34 is connected to support a rotating sprinkler head device 35 by which water is sprayed over the field crop. A sealing ring 33' is provided in an annular recess under the lower end of the boss 33 and is retained therein by the pipe 15', the ring 33' having been fitted in the recess from the underface of the sleeve portion 30. The boss 33 and the sealing ring 33' surround the opening 34' in the pipe 15' and the ring 33' prevents leakage of the water from between the undersurface of the sleeve portion 30 and the pipe 15'.

This partial sleeve portion 30 has further an internally-rounded socket boss 36 that surrounds an opening 36' in the portion 30. A ball stud 37 is mounted in the socket 36 and opening 36' and is retained therein by the pipe 15'. A carriage supporting frame 38 is secured to the stud 37 by a spacer 37', clamping plates 38' and 38" and a clamping bolt 39. This supporting frame 38 is of A-shape having a transverse brace pipe 40 and two lower ends, each of which having a hinge part 41 in which a stub axle 42, serving as a hinge pin, is retained, Fig. 2. On the stub axle 42 is a bushing 43 that extends through the hinge part 41 and on this bushing is an intermediate hinge part 44 upon the ends of a similar A-shaped supporting frame 45. The supporting frame 45 is similarly secured to a ball and socket device indicated generally at 46 on the partial sleeve portion 26 of the yoke 20.

Each stub axle 42 carries a wheel 47 or 47' that has a hub sleeve 48 with bearings 49 and 50 secured to the respective ends thereof and journalled on the stub axle 42 and a rubber tire 51 with inflatable air tube 51'. Washer 52 and a cotter pin 53 secure the wheel 47 or 48 upon the stub axle 42 and a pin 54 extending through the axle 42 and notch 55 in the end of the hinge part 41 secure the stub axle 42 to the hinge part 41 and hold the stub axle against rotation. The pipes are thus suspended from the respective supporting frames 38 and 45 so that they may swivel in a horizontal plane about the center of the gimbal device 18 while at the same time the frames are pivoted fore and aft and relative to each other.

The gimbal device 18 accordingly controls the pivotal movement of the supporting frames upon the stub axles as the pipes are angled relative to each other and keeps them restrained against collapse. The ends of the pipes can thus be pivoted relative to each other while the supporting frames are positively moved to a position at half the angle between the pipes and keep centralized therebetween, as illustrated by the angles A and B of Fig. 3. It will be seen that while the coupling 16 is flexed, the pipes are angled relative to each other and the wheel axes are always kept aligned with the center of the gimbal device 18. This makes an effective and efficient steering arrangement. The wheel carriages are thus steered by the angling of the pipes relative to each other so as to follow the direction of the angled pipes and will travel through the same turning area.

As shown in Fig. 7, the pipe 15 is short and has a wheeled draw carriage 15a adapted to be attached to the tractor draw bar when the irrigator is to be towed. A valve-controlled fitting 15b is provided on the end of pipe 15 to which a water main is connected to deliver the water to the irrigator. A similar carriage and fitting arrangement is provided on the other end of the irrigator so that the irrigator can be pulled or supplied with water from either end thereof.

The water is supplied under pressure to either end of a sprinkler pipe line section 15', which under load, has its intermediate portion bowed under the weight of the water so that sediment in the water will collect in the pipes midway of the length thereof, Fig. 7. It has accordingly been found that the dump valves for each of the pipes should be located at these intermediate portions of the pipes and midway of the carriages. Accordingly, an external automatic pressure responsive dump valve indicated generally at 57 is connected to each of the pipes at such location to effect draining automatically of the pipe upon release of water pressure and to automatically close the drain opening upon reestablishing pressure in the pipe line.

While various changes may be made in the detail construction, it shall be understood that such changes shall be within the spirit and scope of the present invention as defined by the appended claims.

What is claimed is:
1. A mobile irrigator comprising a pipe line formed of pipe sections, a flexible hydraulic coupling connecting the ends of the pipe sections together, a spray head connected to one of the pipe sections, a universal mechanical coupling device secured to the ends of the pipe sections and surrounding the flexible hydraulic coupling, a wheeled carriage having supporting frames hingedly connected together at their lower ends and spanning the pipe ends, the hydraulic coupling and the universal mechanical coupling, swivel means for connecting each of said pipes to its carriage supporting frame, wheels journalled on the lower ends of the supporting frames and lying at the opposite sides of the carriage, the axes of said wheels being aligned with the center of the mechanical coupling device whereby the position of the carriage is positively controlled by the pipe sections as they are angled relative to each other.

2. A mobile irrigator as defined in claim 1, and a sleeve extending from each end of the mechanical coupling device and about the respective pipe ends, said swivel means having a socket secured to the sleeve and accessible from the inner face thereof, a ball connection in said socket and extending outwardly therefrom, each of said pipe sections extending into the sleeves and serving to hold the ball connection in the socket and means for clamping the supporting frame to the ball.

3. A mobile irrigator as defined in claim 1, and a sleeve extending from each end of the universal mechanical coupling device and overlying the top thereof, one sleeve having an outlet boss thereon, said pipe end having an opening aligned with said outlet boss and said spray head connected to said boss outlet, and a sealing ring on the inner end of the boss and engageable by the pipe end to prevent leakage of water between the sleeve and the pipe.

4. A mobile irrigator as defined in claim 1, and each pipe section being uniformly deflectible throughout its length between supporting carriages as when filled with water and an automatic drain valve located midway of said length at the point of maximum deflection of the pipe section and externally thereof to effect draining automatically of the pipe line upon release of the water pressure and to close the drain opening upon re-establishing pressure in the lines.

References Cited in the file of this patent

UNITED STATES PATENTS

| | | |
|---|---|---|
| 288,222 | Flad | Nov. 13, 1883 |
| 2,512,695 | Stout | June 27, 1950 |
| 2,642,311 | Beyer | June 16, 1953 |
| 2,647,533 | Beymer | Aug. 4, 1953 |
| 2,652,282 | Willetts | Sept. 15, 1953 |
| 2,707,117 | Fentress | Apr. 26, 1955 |
| 2,728,605 | Scott | Dec. 27, 1955 |
| 2,742,319 | Tobin | Apr. 17, 1956 |